(12) United States Patent
Muramoto et al.

(10) Patent No.: US 8,773,982 B2
(45) Date of Patent: Jul. 8, 2014

(54) TRANSMITTING TERMINAL AND BANDWIDTH ESTIMATING METHOD

(75) Inventors: Eiichi Muramoto, Kanagawa (JP); Thilmee Baduge, Osaka (JP)

(73) Assignee: Panasonic Corporation, Osaka (JP)

( * ) Notice: Subject to any disclaimer, the term of this patent is extended or adjusted under 35 U.S.C. 154(b) by 190 days.

(21) Appl. No.: 13/387,177

(22) PCT Filed: May 18, 2011

(86) PCT No.: PCT/JP2011/002783
§ 371 (c)(1),
(2), (4) Date: Jan. 26, 2012

(87) PCT Pub. No.: WO2011/158433
PCT Pub. Date: Dec. 22, 2011

(65) Prior Publication Data
US 2012/0128002 A1    May 24, 2012

(30) Foreign Application Priority Data
Jun. 16, 2010    (JP) .................................. 2010-137338

(51) Int. Cl.
*H04L 12/54*    (2013.01)
(52) U.S. Cl.
USPC ............ 370/229; 370/230; 370/232; 370/235
(58) Field of Classification Search
USPC .......... 370/229, 230, 232, 235, 252, 328, 468
See application file for complete search history.

(56) References Cited

U.S. PATENT DOCUMENTS

| | | | | |
|---|---|---|---|---|
| 6,112,323 A | * | 8/2000 | Meizlik et al. | 714/748 |
| 6,151,633 A | * | 11/2000 | Hurst et al. | 709/235 |
| 6,151,696 A | * | 11/2000 | Miller et al. | 714/748 |
| 6,505,253 B1 | * | 1/2003 | Chiu et al. | 709/235 |
| 7,102,998 B1 | * | 9/2006 | Golestani | 370/235 |

(Continued)

FOREIGN PATENT DOCUMENTS

| | | |
|---|---|---|
| JP | 2004-343698 A | 12/2004 |
| JP | 2009-213120 A | 9/2009 |

OTHER PUBLICATIONS

Yamamoto et al. "Congestion Control for Reliable Multicast Achieving TCP Fairness" IEICE Trans. Commun., vol. E85-B, No. 1 Jan. 2002, pp. 183-190.*

(Continued)

*Primary Examiner* — Andrew Chriss
*Assistant Examiner* — Jose Perez
(74) *Attorney, Agent, or Firm* — Pearne & Gordon LLp

(57) ABSTRACT

A transmitting terminal for used in a communication system having the transmitting terminal and receiving terminals which are connected to each other in a tree shape, each of the receiving terminals copies the data transmitted from the transmitting terminal and transfers the copied data to a receiving terminal in downstream, includes a receiving section that receives a receiver report including a packet loss rate and a round trip time, a bandwidth estimation target terminal selection section that selects a receiving terminal to be estimated on the basis of distribution tree information and a packet loss rate included in the receiver report, and a bandwidth estimation section that estimates a bandwidth of the network to control a transmission rate of data on the basis of the packet loss rate and the round trip time included in the receiver report transmitted from the selected receiving terminal.

6 Claims, 11 Drawing Sheets

(56) References Cited

U.S. PATENT DOCUMENTS

| | | | |
|---|---|---|---|
| 8,306,043 B2* | 11/2012 | Breslau et al. | 370/401 |
| 2005/0005020 A1 | 1/2005 | Rey et al. | |
| 2005/0185578 A1* | 8/2005 | Padmanabhan et al. | 370/229 |
| 2011/0002333 A1 | 1/2011 | Karuppiah et al. | |

OTHER PUBLICATIONS

Puri R et al: "Forward error correction (FEC) codes based multiple description coding for internet video streaming and multicast" Signal Processing. Image Communication, Elsevier Science Publishers, Amsterdam, NL, vol. 16, No. 8, May 2001, pp. 745-762.*

Yamamoto et al. Congestion Control for Reliable Multicast Achieving TCP Fairness, IEICE Trans. Commun., vol. E85-B, No. 1 Jan. 2002, pp. 183-190.*

Widmer; TCP-Friendly Multicast Congestion Control (TFMCC): Protocol Specification, RFC4654, Aug. 2006, pp. 1-32.

Yamamoto et al; "A TCP-Friendly Congestion Control Scheme Resolving a Drop-to-zero Problem for Reliable Multicast", The Institute of Electronics Information and Communication Engineers Technical Report, vol. 101, No. 121 Jun. 15, 2001, pp. 7-12.

Murata; "A Study on Multicast Congestion Control Improving Intra-session Fairness in Ad Hoc Networks", Symposium on Multimedia, Distributed, Cooperative and Mobile Systems (DICOMO2007) Ronbunshu, IPSJ Symposium Series, vol. 2007, No. 1 Jun. 29, 2007, pp. 1129-1138.

Rosenberg et al; "An RTP Payload Format for Generic Forward Error Correction", Network Working Group, Request for Comments: 2733 Dec. 1999 pp. 1-26.

Handley et al; "TCP Friendly Rate Control (TFRC): Protocol Specification", Network Working Group, Request for Comments 3448 Jan. 20, 2003 pp. 1-24.

International Search Report for PCT/JP2011/002783 dated Jul. 5, 2011.

* cited by examiner

FIG. 3

| PARENT TERMINAL | CHILD TERMINAL |
|---|---|
| S | n3 |
| n3 | n1, n2 |
| n1 | n4, n5 |
| n2 | n6, n7 |

FIG. 4

| GROUP NAME / FEC STRENGTH | PACKET LOSS RATE |
|---|---|
| GR25 / 25 (%) | LESS THAN 0.05% |
| GR50 / 50 (%) | 0.05% OR MORE AND LESS THAN 0.1% |
| GR100 / 100 (%) | 0.1% OR MORE AND LESS THAN 0.7% |
| GR150 / 150 (%) | 1% OR MORE AND LESS THAN 3% |
| GR200 / 200 (%) | 3% OR MORE |

*FIG. 5*

| RECEIVING TERMINAL | PACKET LOSS RATE REPORTED BY RECEIVING TERMINAL | GROUP |
|---|---|---|
| n5 | 2.3% | GR150 |
| n3 | 1.2% | GR150 |
| n2 | 3.5% | GR200 |
| n6 | 3.6% | GR200 |
| n1 | 2.1% | GR150 |
| n7 | 3.7% | GR200 |
| n4 | 0.06% | GR50 |

FIG. 11

| PARENT TERMINAL | CHILD TERMINAL | COSTS |
|---|---|---|
| S | n3 | 10 |
| n3 | n1 | 15 |
| n1 | n4 | 30 |
| n1 | n5 | 25 |
| n3 | n2 | 20 |
| n2 | n6 | 20 |
| n2 | n7 | 20 | ns
TRANSMITTING TERMINAL AND BANDWIDTH ESTIMATING METHOD

TECHNICAL FIELD

The present invention relates to a transmitting terminal and a bandwidth estimating method, which estimate a bandwidth of a network and controls a transmission rate in conducting a multicast communication through the network.

BACKGROUND ART

For the purpose of delivering remote teaching or a live event, the transmission of real-time stream data such as images or sounds on the network requires that a transmission bandwidth of the real-time stream data is changed in conformity to an available bandwidth on the network. That is, in the transmission over the best effort network such as the internet, it is expected that the network is congested by traffics of other users. When broadband real-time stream data (hereinafter referred to as "stream data") is transmitted while the network is thus congested, packet losses frequently occur so that the images or the sounds may be disturbed or interrupted. For that reason, there is a need to transmit the stream data while changing a bandwidth with which the images or the sounds are encoded by an encoder, after an available bandwidth is estimated over the network.

As a method of estimating the available bandwidth over the network, there has been known a method of estimating the bandwidth with the use of a packet loss rate on the network, and a round trip time (RTT: round trip time) between the transmitting terminal and a receiving terminal.

Also, as a method of transmitting the stream data to a large number of receiving terminals in a point-to-multipoint manner, there has been known a method in which the terminals copy and transfer packets to realize a multipoint communication. For example, as that method, there is an application layer multicast (Application Layer Multicast: ALM). In the ALM, a transmitting terminal transmits a packet to a specified receiving terminal, and the specified receiving terminal copies the packet, and transmits the copied packets to plural other receiving terminals. That is, in the ALM, the specified receiving terminal becomes a parent terminal, and copies and transfers the packets to the plural child terminals to realize the multipoint communication. The entire transfer paths among those terminals are called "distribution tree". In the ALM, because a unicast packet normally used in the internet is used as the packet transmitted between the respective terminals, there is no need to change a router on the network. For that reason, the ALM is advantageous in that the ALM is available over the existing network.

When the stream data is transmitted to the large number of receiving terminals in the point-to-multipoint manner with the available bandwidth on the network, a plurality of paths exist between the transmitting terminal and the receiving terminals. For that reason, there is a need that the specified receiving terminal is selected in the plurality of paths, the bandwidth of the path between the transmitting terminal and the selected receiving terminal is estimated, and the estimated bandwidth is determined as the available bandwidth. Non-patent document 1 has proposed a method in which a receiving terminal worst in a packet loss status is selected as the specified receiving terminal to determine the available bandwidth in the path between the transmitting terminal and the specified receiving terminal. Specifically, Non-patent document 2 has proposed a method in which the available bandwidth is determined with the use of a TFRC (TCP Friendly Rate Control). The TFRC is a method of estimating the available bandwidth with the use of a loss event rate and a round trip time of the packets. In a system of Non-patent document 1, the receiving terminal whose bandwidth is to be estimated is changed every time one receiving terminal worst in the packet loss status is changed to another.

Patent document 1 has proposed a method in which intervals between report packets to be transmitted to a source are controlled to conduct a rate control using the TFRC under a multimedia streaming environment, and also to prevent a problem that the report packets are concentrated on the source. In general, as a time interval at which the packet loss rate is tallied is lengthened, the following property when the network status is changed is deteriorated. For example, when a tallying time of the packet loss rate is intervals of 5 seconds, a status in which the congestion degree of the network is deteriorated cannot be grasped within 5 seconds.

Also, as a method of complementing the packet loss occurring in transmission of stream data on the best effort network such as the internet, an FEC (Forward Error Correction) has been known. For example, in Non-patent document 3, the source generates a redundant code packet from a plurality of packets with the help of an XOR (Exclusive OR) operation, and transmits the redundant code packet to the receiving terminal over the network. For that reason, even if a packet loss occurs on the network, the lost packet of stream data can be regenerated according to the redundant code packet and the packet of the stream data which have arrived at the receiving terminal.

However, the packet loss that can be recovered by the FEC is limited. For example, one redundant code packet is generated from four packets, and if one of those five packets is lost, the lost packet of the stream data can be regenerated from the redundant code packet and the packets of the stream data, which have arrived at the receiving terminal. However, when two or more packets are lost among the five packets, the lost packets of the stream data cannot be regenerated. That is, when the packet loss occurs at given intervals, the packet loss can be recovered by the FEC if the loss rate is 20% or lower, but cannot be recovered by the FEC if the loss rate exceeds 20%. Likewise, when one redundant code packet is generated from three packets, the lost packet of data can be regenerated by the FEC when the loss rate is 25% or lower, but cannot be regenerated by the FEC when the loss rate exceeds 25%.

In the best effort network, when the packet lost in conducting the transmission of the real-time stream data is complemented with the aid of the redundant code packet, an adaptive FEC that changes how to allocate a redundant code according to the loss rate is used. That is, when the adaptive FEC is applied to the above example, one redundant code packet is generated from four packets if the loss rate is 20% or lower, and generated from three packets if the loss rate is from 20% to 25%. That is, when the adaptive FEC is used, a range of the loss rate which can be covered by a specified redundant code allocation system is defined. In the above example, it is assumed that the packet loss occur at the given intervals. In a status in which a random loss occurs, or in a status in which the loss bursts, the range of the loss rate which can be covered with the specified redundant code allocation system is different.

Also, in the best effort network such as the internet, because the traffic volume on the network is not always held constant, the loss rate of the packets fluctuates. For that reason, even when the loss rate viewed from a long-term viewpoint is not changed, the loss rate viewed from a short-term viewpoint may be increased or decreased.

PRIOR ART DOCUMENT

Patent Document

Patent document 1: JP-A-2004-343698
Patent document 2: JP-A-2009-213120

Non-Patent Document

Non-patent document 1: J. Widmer, M. Handley, "TCP-Friendly Multicast Congestion Control (TFMCC): Protocol Specification", RFC4654, August 2006
Non-patent document 2: M. Handley, S. Floyd, J. Padhye, J. Widmer, "TCP Friendly Rate Control (TFRC): Protocol Specification", RFC3448, Jan. 20, 2003
Non-patent document 3: J. Rosenberg, H. Schulzrinne, "An RPT Rayload Format for Generic Forward Error Correction", RFC2722, December 1999

SUMMARY OF THE INVENTION

Problem to be Solved by the Invention

In the above-described method, in transmission of the stream data to the large number of receiving terminals in the point-to-multipoint manner, the receiving terminal worst in the packet loss status is selected to estimate the available bandwidth in the path between the transmitting terminal and the selected receiving terminal, and the rate control for packet transmission is conducted. However, there arises such a problem that the packet loss status on the network is always changed, and one receiving terminal worst in the status is often changed to another, thereby making it difficult to raise a transmission rate with being needlessly dragged by the receiving terminal worst in the packet loss rate.

However, when the tallying time of the packet loss rate in selecting the receiving terminal worst in the packet loss status is long, the above problem is prevented from arising. However, in this case, because the transmission rate cannot be changed according to the status change of the network, the available bandwidth is overshot with the result the packet loss frequently occurs so that the images or the sounds may be disturbed or interrupted.

An object of the present invention is to provide a transmitting terminal and a bandwidth estimating method, which can transmit data with a high quality even if the packet loss status is always changed on the network.

Solution to Problem

The present invention provides a transmitting terminal for used in a communication system in which the transmitting terminal which estimates a bandwidth of a network and controls a transmission rate of data, and a plurality of receiving terminals, each of which copies the data transmitted from the transmitting terminal and transfers the copied data to a receiving terminal in downstream, are connected to each other in a tree shape with the transmitting terminal as a route on the network, the transmitting terminal comprising:

a receiver report receiving section that receives a receiver report including a packet loss rate and a round trip time between the transmitting terminal and each of the receiving terminals, which is transmitted from each of the plurality of receiving terminals;

a bandwidth estimation target terminal selection section that selects a bandwidth estimation target terminal to be estimated in estimating the bandwidth of the network from the plurality of receiving terminals, on the basis of information on a distribution tree configured by the transmitting terminal and the plurality of receiving terminals and a packet loss rate included in the receiver report transmitted from each of the plurality of receiving terminals; and a bandwidth estimation section that estimates the bandwidth of the network on the basis of the packet loss rate and the round trip time included in the receiver report transmitted from the receiving terminal selected by the bandwidth estimation target terminal selection section.

The present invention provides a bandwidth estimating method conducted by a transmitting terminal for used in a communication system in which the transmitting terminal which estimates a bandwidth of a network and controls a transmission rate of data, and a plurality of receiving terminals, each copies the data transmitted from the transmitting terminal and transfers the copied data to a receiving terminal in downstream, are connected to each other in a tree shape with the transmitting terminal as a route on the network, the bandwidth estimating comprising:

receiving a receiver report including a packet loss rate and a round trip time between the transmitting terminal and each of the receiving terminals, which is transmitted from each of the plurality of receiving terminals;

selecting a bandwidth estimation target terminal to be estimated in estimating the bandwidth of the network from the plurality of receiving terminals, on the basis of information on a distribution tree configured by the transmitting terminal and the plurality of receiving terminals, and a packet loss rate included in the receiver report transmitted from each of the plurality of receiving terminals; and estimating the bandwidth of the network on the basis of the packet loss rate and the round trip time included in the receiver report transmitted from the selected receiving terminal.

Advantages of the Invention

In the transmitting terminal and the bandwidth estimating method according to the present invention, data can be transmitted with a high quality even if the packet loss status is always changed on the network.

BRIEF DESCRIPTION OF THE DRAWINGS

FIG. 3 is a diagram illustrating an example of distribution tree information in the operation status illustrated in FIG. 1.
FIG. 4 is a diagram illustrating a list of groups corresponding to packet loss rates.
FIG. 5 is a diagram illustrating an example in which a bandwidth estimation target terminal selection section 105 classifies the receiving terminals into groups on the basis of the packet loss rates included in receiver reports from the receiving terminals under the operation status illustrated in FIG. 1.

FIG. 11 is a diagram illustrating an example of the costs between the terminals in the operation status illustrated in FIG. 1.

MODES FOR CARRYING OUT THE INVENTION

Hereinafter, embodiments of the present invention will be described in detail with reference to the drawings.

Figure 1:
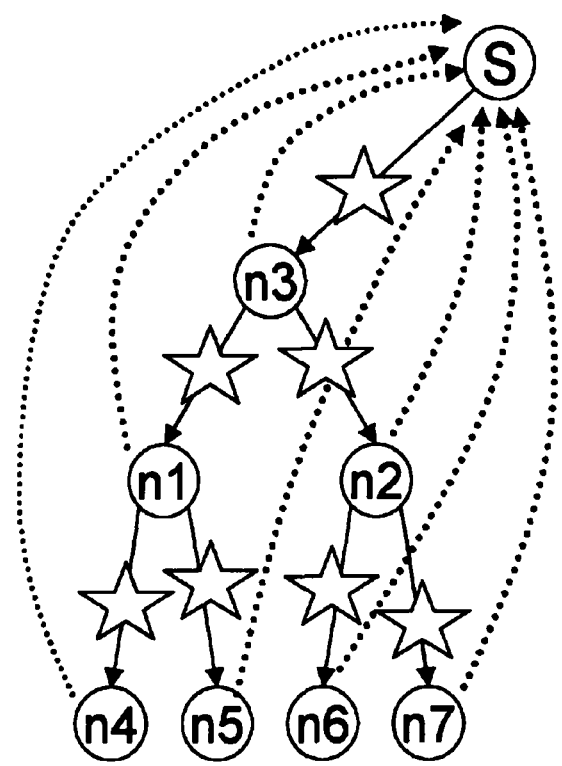
FIG. 1 is a diagram illustrating an example of an operation status according to an embodiment of the present invention.

FIG. 1 is a diagram illustrating an example of an operation status according to an embodiment of the present invention. In the operation status illustrated in FIG. 1, a transmitting terminal S and receiving terminals n1 to n7 are connected to each other in a tree shape on a network so that the transmitting terminal S is a root, and the receiving terminals n1 to n7 are leaves.

As illustrated in FIG. 1, the transmitting terminal S transmits a packet of an image or a sound to the receiving terminal n3 over the network, and the receiving terminal n3 receives and copies the packet, and transmits the copied packets to the downstream receiving terminals n1 and n2. Likewise, the respective receiving terminals n1 and n2 receive and copy the copied packets, and transmit the copied packets to the downstream receiving terminals n4 to n7. That is, FIG. 1 illustrates an appearance in which the packet of real-time stream data such as the image or the sound is delivered to the downstream receiving terminals while being relayed by the receiving terminals.

Dotted lines illustrated in FIG. 1 represent an appearance in which receiver reports as the packets on the network are transmitted to the transmitting terminal S from the receiving terminals. Also, star marks (☆) illustrated in FIG. 1 each represent that a packet loss occurs on a link.

An entire transfer path having a logical structure such as a tree including information on which of the receiving terminals the packets copied by the receiving terminals are transmitted to is called "distribution tree". The respective receiving terminals on the distribution tree detect the packet losses occurring on the network on the basis of gaps in sequential numbers, and maintain statistics about the packet loss rate. The receiving terminals transmit the receiver reports each including the packet loss rate to the transmitting terminal S.

The transmitting terminal S estimates an available bandwidth on the network on the basis of a round trip time (RTT) between the transmitting terminal S and each receiving terminal, which is included in the receiver report, and the packet loss rate. The transmitting terminal S determines a bit rate in encoding data of the sound or the image. Because the transmitting terminal S receives the respective receiver reports from the plurality of receiving terminals, there is a need to determine from which receiving terminal the bandwidth is estimated on the basis of the receiver report because the transmitting terminal S receive the respective receiver reports from the plurality of receiving terminals. The transmitting terminal S selects the receiving terminal to be estimated in bandwidth with the aid of information on the group of the receiving terminal and information on the distribution tree.

Figure 2:
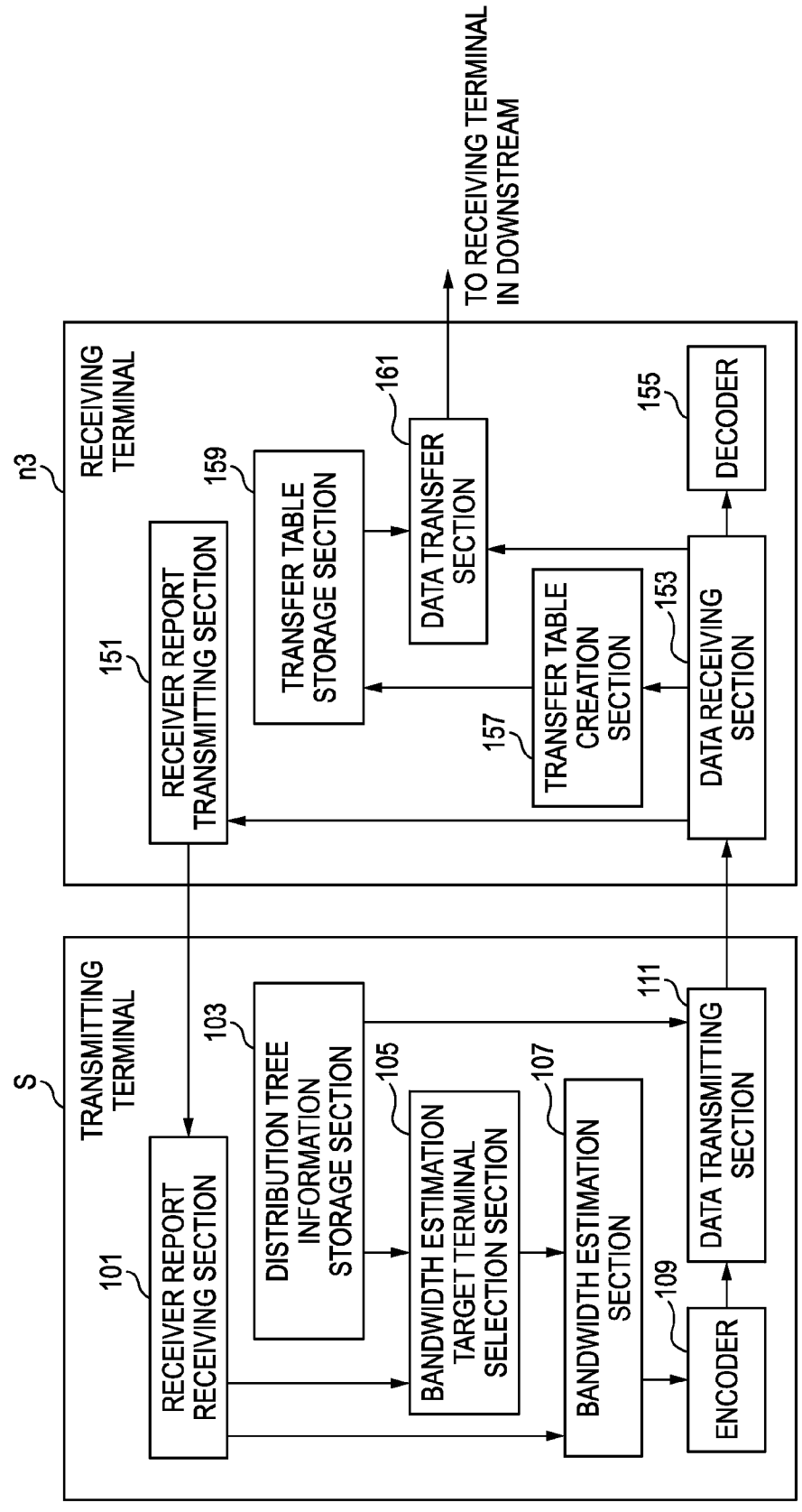
FIG. 2 is block diagram illustrating the respective internal configurations of a transmitting terminal S and receiving terminals n1 to n7 illustrated in FIG. 1.

FIG. 2 is block diagram illustrating the respective internal configurations of the transmitting terminal S and the receiving terminals n1 to n7 illustrated in FIG. 1. As illustrated in FIG. 2, the transmitting terminal S includes a receiver report receiving section 101, a distribution tree information storage section 103, a bandwidth estimation target terminal selection section 105, a bandwidth estimation section 107, an encoder 109, and a data transmitting section 111. Also, each of the receiving terminals n1 to n7 includes a receiver report transmitting section 151, a data receiving section 153, a decoder 155, a transfer table creation section 157, a transfer table storage section 159, and a data transfer section 161.

Hereinafter, the respective components provided in the transmitting terminal S will be described. The receiver report receiving section 101 receives the receiver report transmitted from each receiving terminal over the network. Each receiver report includes information indicative of the round trip time (RTT) between the transmitting terminal S and each receiving terminal on the network, and information indicative of the packet loss rate when the receiving terminal receives data transmitted from the transmitting terminal S over the network. Also, the receiver report may be a receiver report specified by RFC3550. Also, the receiver report may include a measurement period of the packet loss rate, or a weighted average efficiency of the past packet loss rates.

The distribution tree information storage section 103 stores the distribution tree information indicative of information that the receiving terminal that has received a packet from the transmitting terminal S copies the packet, and transmits the copied packet to any receiving terminal therein. The distribution tree information is deviated from information on a bandwidth and a delay relative to the receiving terminal, which has been statically allocated, or obtained by measurement, before a session of data transmission starts. For example, the distribution tree information is deviated from a calculation algorithm of a minimum spanning tree which has been widely known in a graph theory. Alternatively, the distribution tree information may be deviated from a technique disclosed in Patent document 2. The distribution tree information storage section 103 is not limited to being equipped within the transmitting terminal S, but may be disposed in a server accessible by the transmitting terminal S. Also, the distribution tree information may be changed during the session.

FIG. 3 is a diagram illustrating an example of the distribution tree information in the operation status illustrated in FIG. 1. A "child terminal" illustrated in FIG. 3 represents a downstream receiving terminal linked directly with a "parent terminal" on the distribution tree. Symbols S and n1 to 1y indicative of the terminals in FIG. 3 each specify a pair of an IP address and a port number of each terminal. In the example illustrated in FIG. 3, the distribution tree information is represented by a table, but may be represented by another configuration such as a graph structure, a list structure, or a bit map.

The bandwidth estimation target terminal selection section 105 selects, when the bandwidth estimation section 107 estimates an available bandwidth on the network, the receiving terminal (bandwidth estimation target terminal) that has transmitted the receiver report serving as the basis for estimation. In selecting the bandwidth estimation target terminal, the bandwidth estimation target terminal selection section 105 groups the receiving terminals on the basis of the packet loss rates of the receiving terminals. FIG. 4 is a diagram illustrating a list of groups corresponding to the packet loss rates. In this embodiment, the receiving terminals are grouped by the rate of the redundant codes of an FEC (Forward Error Correction) that is a function for recovering the lost packet. For example, the packet loss rate that is recoverable when the redundant code 25(%) of the FEC is allocated is defined as less than 0.05%, and a group in this case is "GR25".

In the above example, the receiving terminals are grouped according to the packet loss rate that is recoverable by the FEC. However, the grouping does not always need to be based on the packet loss rate that is recoverable by the FEC. For example, the receiving terminals may be grouped according to the packet loss rate that is recoverable by a decoder of data such as images or sounds. Further, when the packet loss rate in a short tallying period is used, the grouping may be conducted with the aid of information adding the packet loss rate that can be determined as an error. That is, there is a possibility that the packet loss of lower than 1% by an encoder of the images or the sounds can be recovered by the decoder, and the packet loss of 1% or more and less than 3% is recovered by error concealment (error concealment). Specifically, if there is a possibility that data can be recovered by the error concealment to the extent that does not influence subjective values, the packet loss rate is defined by using threshold values thereof, and the receiving terminals may be grouped according to the packet loss.

Figure 6:
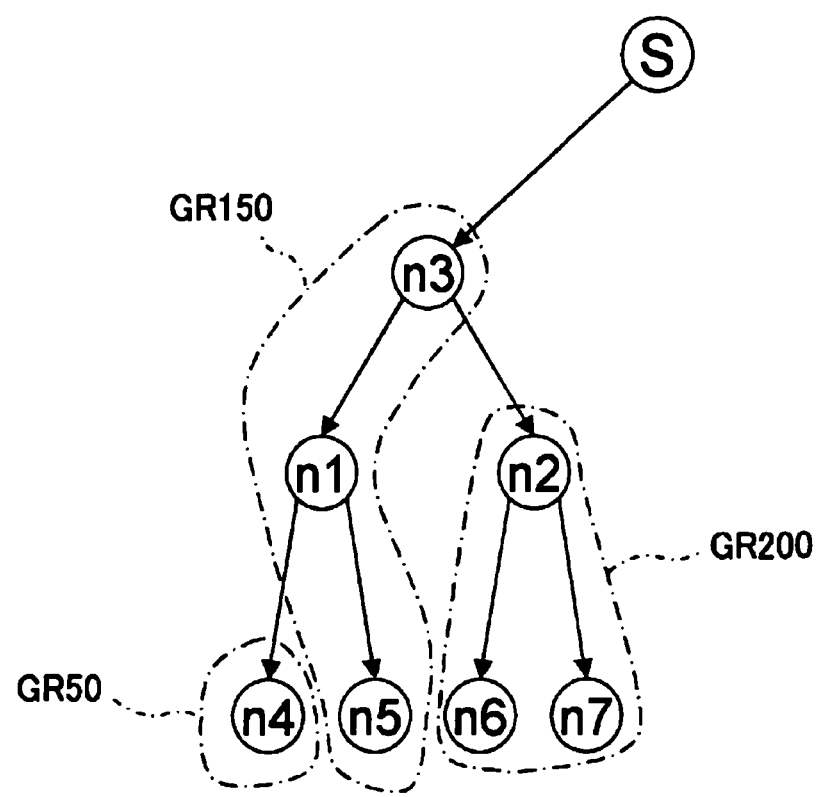
FIG. 6 is a conceptual diagram illustrating a state in which the receiving terminals n1 to n7 illustrated in FIG. 1 are classified into the groups illustrated in FIG. 5.

FIG. 5 is a diagram illustrating an example in which the bandwidth estimation target terminal selection section 105 groups the receiving terminals on the basis of the packet loss rates included in receiver reports from the receiving terminals under the operation status illustrated in FIG. 1. FIG. 6 is a conceptual diagram illustrating a state in which the receiving terminals n1 to n7 illustrated in FIG. 1 are divided into the groups illustrated in FIG. 5. Symbols GR50, GR150, and GR200 indicated by dashed lines in FIG. 6 represent groups of the receiving terminals. The transmitting terminal S groups the receiving terminals on the basis of the packet loss rates included in the receiver reports. As illustrated in FIGS. 5 and 6, the bandwidth estimation target terminal selection section 105 groups the receiving terminals on the basis of the packet loss rates included in the receiver reports from the receiving terminals, and a relationship between the packet loss rates and the groups illustrated in FIG. 4.

Further, the bandwidth estimation target terminal selection section 105 selects the bandwidth estimation target terminal on the basis of the information illustrated in FIG. 5 and the distribution tree information illustrated in FIG. 3. A method of selecting the bandwidth estimation target terminal by the bandwidth estimation target terminal selection section 105 will be described in detail later.

The bandwidth estimation section 107 estimates the bandwidth available in the path between the transmitting terminal S and the bandwidth estimation target terminal with the aid of a TFRC (TCP Friendly Rate Control) known by Non-patent document 2.

The encoder 109 encodes stream data of images or sounds at a bit rate corresponding to the bandwidth estimated by the bandwidth estimation section 107. The data transmitting section 111 transmits the stream data encoded by the encoder 109 to the receiving terminals in the form of packets over the network. Also, the data transmitting section 111 transmits the distribution tree information stored in the distribution tree information storage section 103 to the receiving terminals over the network.

Hereinafter, the respective components provided in each of the receiving terminals n1 to n7 will be described. The receiver report transmitting section 151 transmits the receiver report including the round trip time (RTT) and the packet loss rate to the transmitting terminal S. The receiving terminal calculates the packet loss rate when detecting switching of the tallying period on the basis of codes indicative of a start and an end of tallying described in the packet. For example, the receiving terminal may calculate the packet loss rate as RNG/(ROK+RNG) according to the number of packets ROK that could be received and the number of packets RNG that could not been received. Also, the receiving terminal may calculate the packet loss rate through the above expression according to the number of packets ROK that could be received during a specific time such as 5 seconds and the number of packets RNG that could not be received thereduring. Thus, the packet loss rate may be calculated on the same basis in all of the receiving terminals, and a length of the tallying period is no object.

The data receiving section 153 receives the packet of the stream data transmitted from the transmitting terminal S, or the packet of the stream data transferred from another receiving terminal. Also, the data receiving section 153 receives the distribution tree information transmitted from the transmitting terminal S. The decoder 155 decodes the stream data transmitted from the transmitting terminal S, or the stream data transferred from another receiving terminal.

The transfer table creation section 157 creates a transfer table that is information on a destination of the packet of the stream data to be transferred, on the basis of the distribution tree information transmitted from the transmitting terminal S. The transfer table specifies a pair of destination address and destination port number. The number of destinations specified by the transfer table may be plural. The destination is a downstream receiving terminal on the distribution tree. The transfer table storage section 159 stores the transfer table created by the transfer table creation section 157 therein.

The data transfer section 161 copies the packet of the stream data received by the data receiving section 153, and transfers the packet to the destination indicated by the transfer table. That is, the data transfer section 161 acquires the information on the pair of the IP address and the port number of the destination with reference to the transfer table with the port number described in a header of the packet as a key. Thereafter, the data transfer section 161 copies the packet according to the information. Then, the data transfer section 161 rewrites the IP address and the port number, which are described in the header of the copied packet, into the IP address and the port number of the destination. Then, the data transfer section 161 recalculates information on necessary check sum and resets the information to the packet. Thereafter, the data transfer section 161 transfers the copied packet to the downstream receiving terminal which is the destination over the network.

Figure 7:
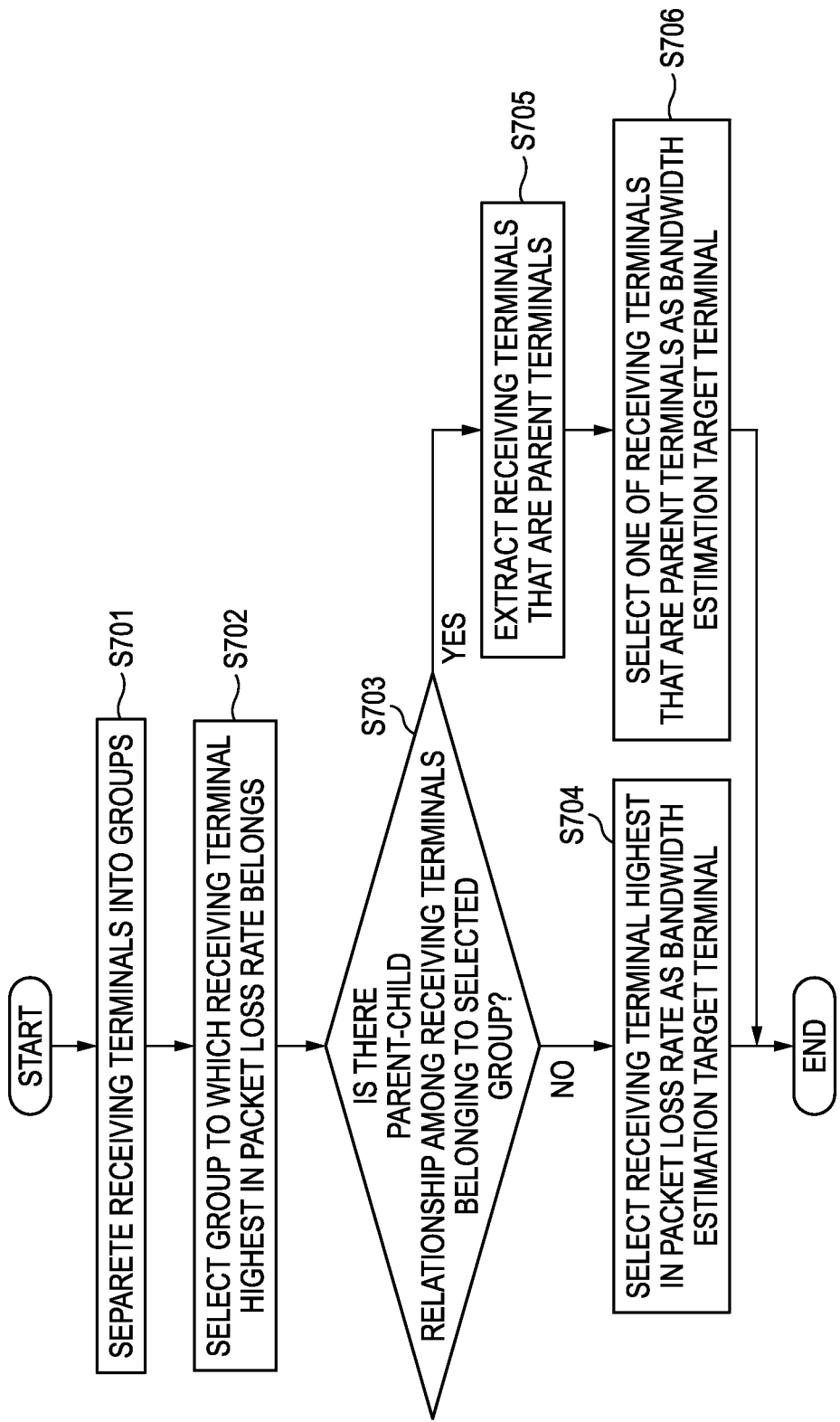
FIG. 7 is a flowchart illustrating processing when the bandwidth estimation target terminal selection section 105 provided in the transmitting terminal S selects a bandwidth estimation target terminal.

Hereinafter, a description will be given of a method of selecting the bandwidth estimation target terminal by the bandwidth estimation target terminal selection section 105 provided in the transmitting terminal S in detail. FIG. 7 is a flowchart illustrating processing when the bandwidth estimation target terminal selection section 105 provided in the transmitting terminal S selects the bandwidth estimation target terminal. As illustrated in FIG. 7, the bandwidth estimation target terminal selection section 105 first groups the receiving terminals on the basis of the packet loss rates included the receiver reports from the receiving terminals (Step S701). Then, the bandwidth estimation target terminal selection section 105 selects a group to which the receiving terminal that has transmitted the receiver report including the highest packet loss rate belongs (Step S702). In the example illustrated in FIG. 5, the bandwidth estimation target terminal selection section 105 selects the group GR 200 to which the receiving terminal n7 having the highest packet loss rate of 3.7% belongs.

Then, the bandwidth estimation target terminal selection section 105 determines whether there is a parent-child relationship between the receiving terminals belonging to the group selected in Step S702, or not, with reference to the distribution tree information (Step S703). In the operation status illustrated in FIG. 1, when the receiving terminals n1 to n7 are classified into the groups illustrated in FIG. 5, the bandwidth estimation target terminal selection section 105 determines whether there is the parent-child relationship among the receiving terminals n2, n6, and n7 belonging to the group GR200, or not. The detail of the determining method will be described below with reference to FIG. 8.

If it is determined that there is no parent-child relationship (no in Step S703), the bandwidth estimation target terminal selection section 105 selects the receiving terminal highest in the packet loss rate among the receiving terminals belonging to the selected group as the bandwidth estimation target terminal (Step S704). On the other hand, it is determined that there is the parent-child relationship (yes in Step S703), the bandwidth estimation target terminal selection section 105 extracts at least one receiving terminal that is a parent terminal from the receiving terminals belonging to the group selected in Step S702 (Step S705). Then, the bandwidth estimation target terminal selection section 105 selects one of the receiving terminals extracted in Step S705 as the bandwidth estimation target terminal (Step S706). In the operation status illustrated in FIG. 1, if the receiving terminals n1 to n7 are classified into the groups illustrated in FIG. 5, because the receiving terminal n2 is the parent terminal, the bandwidth estimation target terminal selection section 105 selects the receiving terminal n2 as the bandwidth estimation target terminal. The detail of the method of extracting and selecting the parent terminal will be described later.

Figure 8:
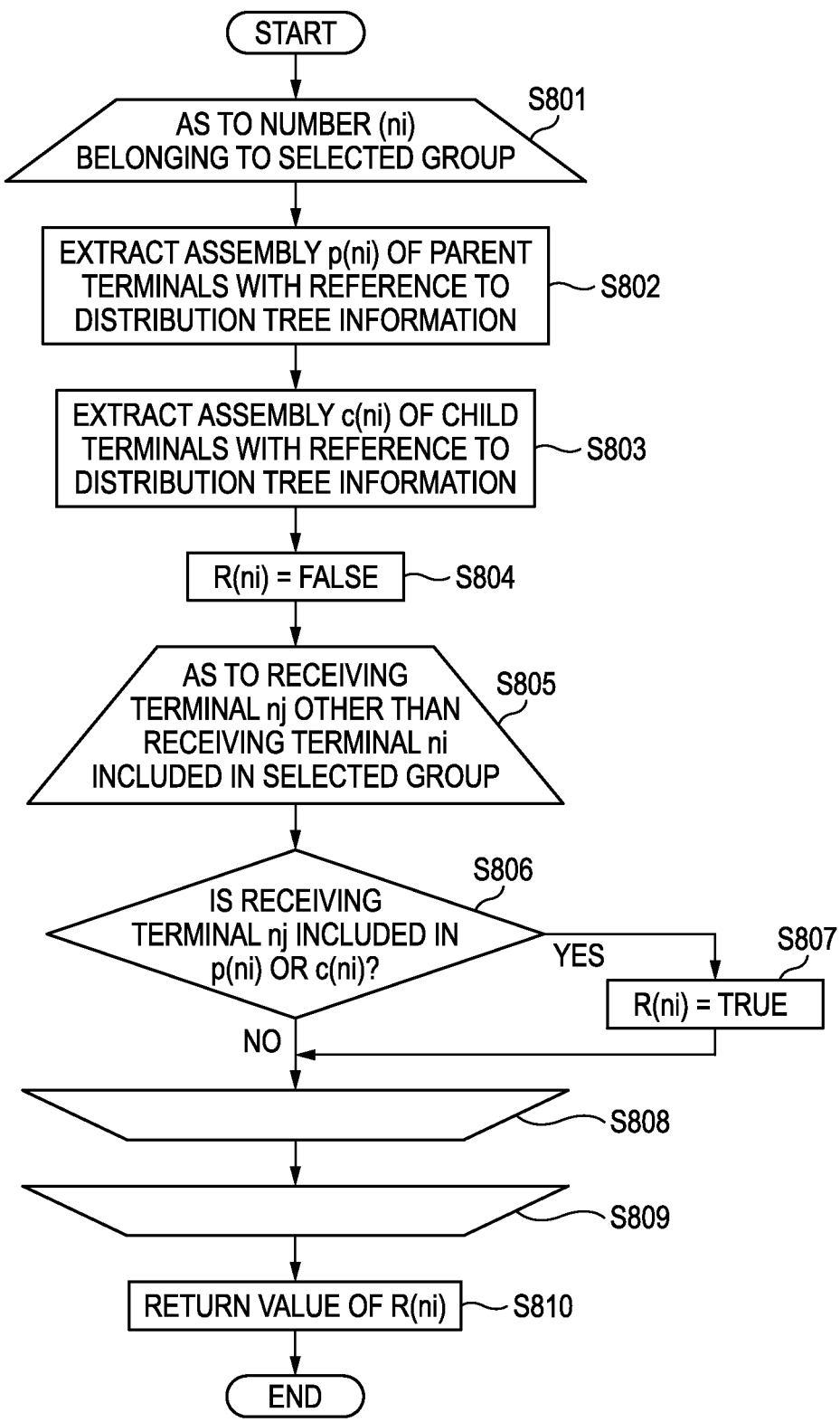
FIG. 8 is a flowchart illustrating a detail of processing conducted in Step S703 in FIG. 7.

Hereinafter, a description will be given of processing conducted in Step S703 in FIG. 7, that is, processing for determining whether there is the parent-child relationship among the receiving terminals belonging to the selected group, or not, in detail with reference to FIG. 8. FIG. 8 is a flowchart illustrating a detail of processing conducted in Step S703 in FIG. 7. As illustrated in FIG. 8, the bandwidth estimation target terminal selection section 105 conducts processing surrounded by repeat loops S801 and S809 for each of the receiving terminals (ni) belonging to the selected group (hereinafter referred to simply as "group").

In Step S802, the bandwidth estimation target terminal selection section 105 extracts an assembly p(ni) of the parent terminals of the receiving terminals ni with reference to the distribution tree information. In the operation status illustrated in FIG. 1, if the selected group is GR200, and the receiving terminal ni is the receiving terminal n6, p(n6)={n2} is obtained as an assembly of the parent terminals. Also, if the receiving terminal ni is the receiving terminal n7, p(n7)={n2} is obtained, and if the receiving terminal ni is the receiving terminal n2, p(n2)=null is obtained. Also, if the selected group is GR150, and the receiving terminal ni is the receiving terminal n5, p(n5)={n1, n3} is obtained. If the receiving terminal ni is the receiving terminal n1, p(n1)={n3} is obtained, and if the receiving terminal ni is the receiving terminal n3, p(n3)=null is obtained. Further, if the selected group is GR500, p(n4)=null is obtained because the receiving terminal ni is only the receiving terminal n4.

Then, in Step S803, the bandwidth estimation target terminal selection section 105 extracts an assembly c(ni) of the child terminals of the receiving terminals ni with reference to the distribution tree information. In the operation status illustrated in FIG. 1, if the selected group is GR200, and the receiving terminal ni is the receiving terminal n6, c(n6)=null is obtained as the assembly of the child terminals. Also, if the receiving terminal ni is the receiving terminal n7, c(n7)=null is obtained, and if the receiving terminal ni is the receiving terminal n2, c(n2)={n6, n7} is obtained. Also, if the selected group is GR150, and the receiving terminal ni is the receiving terminal n5, c(n5)=null is obtained. If the receiving terminal ni is the receiving terminal n1, c(n1)={n5} is obtained, and if the receiving terminal ni is the receiving terminal n3, c(n3)={n1, n5} is obtained. Also, the selected group is GR50, c(n4)=null is obtained because the receiving terminal ni is only the receiving terminal n4.

Then, the bandwidth estimation target terminal selection section 105 initializes a function R(ni) indicative of whether there is the parent-child relationship, or not, to "false" (Step S804). Then, the bandwidth estimation target terminal selection section 105 conducts processing surrounded by repeat loops S805 and S808. That is, the bandwidth estimation target terminal selection section 105 determines whether a receiving terminal nj other than the receiving terminal ni included in the selected group is included in the extracted parent assembly p(ni) or the extracted child assembly c(ni), or not (Step S806).

Figure 9:
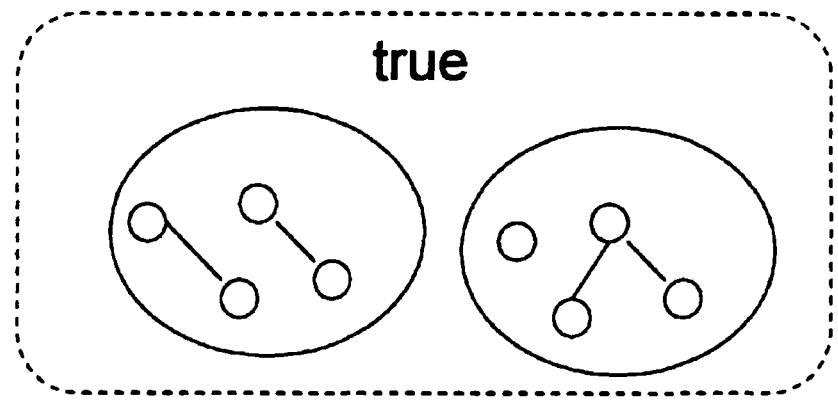
FIG. 9 is a diagram illustrating an example of a parent-child relationship of the receiving terminals in each group to which the receiving terminals having the parent-child relationship belong.

If it is determined that at least one receiving terminal nj is included in the parent assembly p(ni) or the child assembly c(ni) (yes in Step S806), the bandwidth estimation target terminal selection section 105 determines that there is the parent-child relationship between the receiving terminals belonging to the selected group. Then, the bandwidth estimation target terminal selection section 105 sets the function R(ni) to "true" (Step S807). FIG. 9 is a diagram illustrating an example of the parent-child relationship of the receiving terminals in each group to which the receiving terminals having the parent-child relationship belong. As illustrated in FIG. 9, if both ends (receiving terminals) of each link of the distribution tree, which is indicated by a straight line, exist within the group, it is determined that there is the parent-child relationship therebetween.

Figure 10:
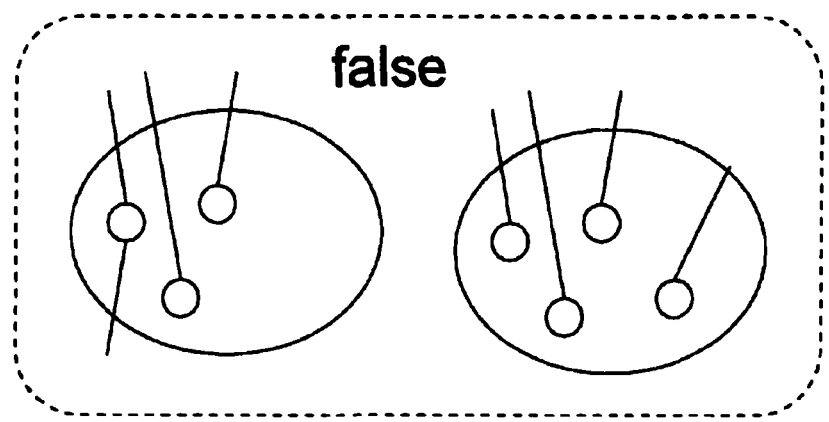
FIG. 10 is a diagram illustrating an example of the parent-child relationship of the receiving terminals in each group to which the receiving terminals having no parent-child relationship belong.

On the other hand, if it is determined that none of the receiving terminals nj is included in the parent assembly p(ni) or the child assembly c(ni) (no in Step S806), the bandwidth estimation target terminal selection section 105 determines that there is no parent-child relationship between the receiving terminals belonging to the selected group. Then, the bandwidth estimation target terminal selection section 105 maintains a value of the function R(ni) at "false" without any change. FIG. 10 is a diagram illustrating an example of the parent-child relationship of the receiving terminals in each group to which the receiving terminals having no parent-child relationship belong.

The bandwidth estimation target terminal selection section 105 conducts the processing surrounded by Steps S801 and S809 on all of the receiving terminals ni, and thereafter returns the value of the function R(ni) thereto (Step S810). The bandwidth estimation target terminal selection section 105 proceeds to Step S704 if a value of R(ni)=false is obtained, and proceeds to Step S705 if a value of R(ni)=true is obtained.

In the determining method described above with reference to FIG. 8, the above processing is conducted on only the receiving terminals belonging to the selected group. The bandwidth estimation target terminal selection section 105 may scan all of the rinks in the distribution tree, and determine that there is the parent-child relationship if the receiving terminals at both ends thereof are included in the selected group. In the method, the amount of computation is increased according to a scale of the distribution tree.

Hereinafter, a description will be given of processing conducted by Step S705 in FIG. 7, that is, processing for extracting the receiving terminals that are the parent terminals from the selected group in detail. The bandwidth estimation target terminal selection section 105 develops a sum of the assemblies p(ni) of the parent terminals of the respective receiving terminals, which are obtained in Step S802 in FIG. 8. When the selected group is GR200 in the operation status illustrated in FIG. 1, p(n6)={n2}, p(n7)={n2}, and p(n2)=null are obtained as the assemblies of the parent terminals. For that reason, the bandwidth estimation target terminal selection section 105 extracts the receiving terminal n2 which is the sum of those three assemblies. Also, if the selected group is GR150, p(n5)={n1, n3}, p(n1)={n3}, and p(n3)=null are obtained as the assemblies of the parent terminals. For that reason, the bandwidth estimation target terminal selection section 105 extracts two receiving terminals n1 and n3 which are the sum of those three assemblies.

Hereinafter, a description will be given of processing conducted in Step S706 in FIG. 7, that is, processing for selecting one of the receiving terminals extracted in Step S705 as the bandwidth estimation target terminal in detail. If the number of receiving terminals extracted in Step S705 is one, the bandwidth estimation target terminal selection section 105 selects the receiving terminal as the bandwidth estimation target terminal. For example, when the selected group is GR200 in the operation status illustrated in FIG. 1, the receiving terminal n2 is extracted as the parent terminal. For that reason, the bandwidth estimation target terminal selection section 105 selects the receiving terminal n2 as the bandwidth estimation target terminal.

Also, if the number of receiving terminals extracted in Step S705 is plural, the bandwidth estimation target terminal selection section 105 selects the receiving terminal lowest in the total costs of a path extending from the parent terminal to the receiving terminal among the extracted receiving terminals as the bandwidth estimation target terminal. The total costs of a path extending from the parent terminal to the receiving terminal may be obtained by weighting and aggregating values derived from an inverse number of the bandwidth, a transmission delay time of the link, the round trip time (RTT) between the terminals, or the packet loss rate.

FIG. 11 is a diagram illustrating an example of the total costs between the terminals in the operation status illustrated in FIG. 1. When the selected group is GR150 in the operation status illustrated in FIG. 1, the two receiving terminals n1 and n3 are extracted as the parent terminals. In this situation, the bandwidth estimation target terminal selection section 105 selects the receiving terminal lower in the total costs as the bandwidth estimation target terminal with reference to the total costs of the paths between the terminals illustrated in FIG. 11. That is, referring to FIG. 11, the total costs of the path extending from the receiving terminal n3 that is the parent terminal of the receiving terminal n1 to the receiving terminal n1 are 15. On the other hand, the total costs of the path extending from the transmitting terminal S that is the parent terminal of the receiving terminal n3 to the receiving terminal n3 are 10. For that reason, the bandwidth estimation target terminal selection section 105 selects the receiving terminals n3 as the bandwidth estimation target terminal.

Figure 12:
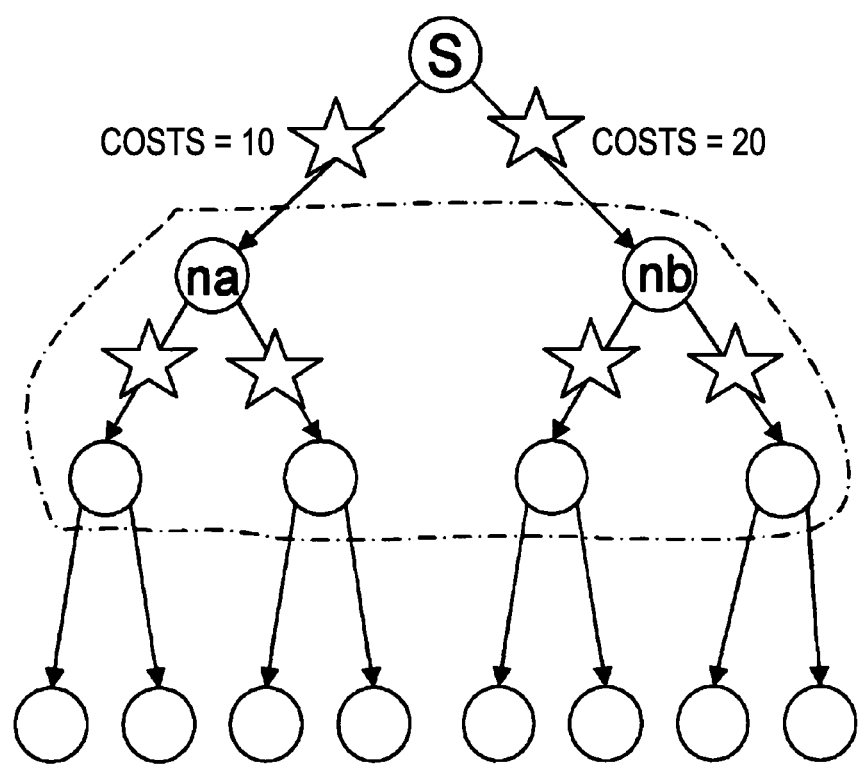
FIG. 12 is a diagram illustrating another example of the operation status according to the embodiment of the present invention.

Also, if the group indicated by a dashed line is selected in the operation status illustrated in FIG. 12, the two receiving terminals na and nb are extracted as the parent terminals. Similarly, in this case, the bandwidth estimation target terminal selection section 105 selects the receiving terminal lower in the total costs as the bandwidth estimation target terminal with reference to the total costs of the paths between the terminals. That is, referring to FIG. 12, the total costs of the path extending from the transmitting terminal S that is the parent terminal of the receiving terminal nb to the receiving terminal nb are 20. On the other hand, the total costs of the path extending from the transmitting terminal S that is the parent terminal of the receiving terminal na to the receiving terminal na are 10. For that reason, the bandwidth estimation target terminal selection section 105 selects the receiving terminals na as the bandwidth estimation target terminal.

If the plurality of receiving terminals are extracted as the parent terminals, and the costs between the respective receiving terminals and each of the parent terminals are identical with each other, the bandwidth estimation target terminal selection section 105 may select any extracted receiving terminal as the bandwidth estimation target terminal.

As described above, according to the embodiment of the present invention, the receiving terminals are grouped according to the range of the packet loss rate, and one of the receiving terminals belonging to the selected group is selected as the bandwidth estimation target terminal with reference to the distribution tree information. For that reason, the receiving terminals to be estimated when the bandwidth estimation section 107 of the transmitting terminal S estimates the bandwidth is not changed on the terminal basis, but changed on the group basis. Accordingly, because the bandwidth estimation target terminal is not frequently changed, the deterioration of the transmission rate caused by the receiving terminal having a high packet loss rate can be prevented. As a result, even if a long-term change in the packet loss rate is smaller, and a short-term change in the packet loss rate is larger, data of images or sounds can be transmitted with a high quality over the best effort network.

Also, the frequency of changing the bandwidth estimation target terminal becomes low even within the group of the packet loss rate that can be compensated by the recovery ability of the FEC provided in the decoder of the receiving terminal. For that reason, the bandwidth estimation target terminal is not frequently changed. That is, according to the embodiment of the present invention, the frequent change in the bandwidth estimation target terminal can be suppressed without lengthening the tallying period of the packet loss rate. As a result, the deterioration of the transmission rate due to a phenomenon in which the receiving terminal having the worst packet loss rate is changed can be prevented without losing the property of following the occurrence of the packet loss.

The present invention has been described in detail and with reference to the specified embodiments. However, it would be apparent to one skilled in the art that the present invention could be variously modified or corrected without departing from the spirit and scope of the present invention.

The present invention is based on Japanese Patent Application No. 2010-137338 filed on Jun. 16, 2010, and the contents of which are incorporated herein by reference.

INDUSTRIAL APPLICABILITY

The transmitting terminal according to the present invention is useful as a communication terminal that enables data transmission with a high quality even if the packet loss status on the network is always changed, the long-term change in the packet loss rate is smaller, and the short-term change in the packet loss rate is larger.

DESCRIPTION OF REFERENCE SYMBOLS

S, transmitting terminal
n1 to n7, receiving terminal
101, receiver report receiving section
103, distribution tree information storage section
105, bandwidth estimation target terminal selection section
107, bandwidth estimation section
109, encoder
111, data transmitting section
151, receiver report transmitting section
153, data receiving section
155, decoder
157, transfer table creation section
159, transfer table storage section
161, data transfer section

The invention claimed is:

1. A transmitting terminal for use in a communication system in which the transmitting terminal estimates a bandwidth of a network and controls a transmission rate of data, and a plurality of receiving terminals, each of which copies the data transmitted from the transmitting terminal and transfers the copied data to a receiving terminal downstream, are connected to each other in a tree structure such that the transmitting terminal is configured as a root on the network and the plurality of receiving terminals are configured as leaves on the network, wherein the transmitting terminal is configured to:

receive a receiver report including a packet loss rate and a round trip time between the transmitting terminal and each of the receiving terminals, which is transmitted from each of the plurality of receiving terminals;

select a target terminal for estimating the bandwidth of the network from the plurality of receiving terminals, on the basis of information on a distribution tree storage section, the distribution tree storage section comprising information regarding the transmitting terminal and the plurality of receiving terminals, and a packet loss rate included in the receiver report transmitted from each of the plurality of receiving terminals, estimate the bandwidth of the network on the basis of the packet loss rate and the round trip time included in the receiver report transmitted from the target terminal, and separate the respective receiving terminals into groups on the basis of the packet loss rates included in the receiver reports transmitted from the plurality of receiving terminals respectively, and select the target terminal from the group having the receiving terminal with highest packet loss rate, wherein the transmitting terminal is further configured to determine whether or not there is a parent-child relationship among the receiving terminals within the group having the receiving terminal with the highest packet loss rate, wherein if there is no parent-child relationship, the transmitting terminal is configured to select the receiving terminal having the highest packet loss rate as the target terminal; and wherein if there is a parent-child relationship, the transmitting terminal is configured to select the receiving terminal which is the parent terminal of the group as the target terminal.

2. The transmitting terminal according to claim 1, wherein the respective groups classified, when the transmitting terminal separates the plurality of receiving terminals into the groups, are different from each other in a range of the packet loss rate at which the plurality of receiving terminals can recover a lost packet through a given error correction technique.

3. A bandwidth estimating method conducted by a transmitting terminal for use in a communication system in which the transmitting terminal estimates a bandwidth of a network and controls a transmission rate of data, and a plurality of receiving terminals, each of which copies the data transmitted from the transmitting terminal and transfers the copied data to a receiving terminal downstream, are connected to each other in a tree structure such that the transmitting terminal is configured as a root on the network and the plurality of receiving terminals are configured as leaves on the network, the bandwidth estimating method comprising:

receiving a receiver report including a packet loss rate and a round trip time between the transmitting terminal and each of the receiving terminals, which is transmitted from each of the plurality of receiving terminals;

selecting a target terminal for estimating the bandwidth of the network from the plurality of receiving terminals, on the basis of information on a distribution tree storage section, the distribution tree storage section comprising information regarding the transmitting terminal and the plurality of receiving terminals, and a packet loss rate included in the receiver report transmitted from each of the plurality of receiving terminals, estimating the bandwidth of the network on the basis of the packet loss rate and the round trip time included in the receiver report transmitted from the target terminal, separating the respective receiving terminals into groups on the basis of the packet loss rates included in the receiver reports transmitted from the plurality of receiving terminals respectively, and selecting the target terminal from the group having the receiving terminal with highest packet loss rate, and determining whether or not there is a parent-child relationship among the receiving terminals within the group having the receiving terminal with the highest packet loss rate, wherein if there is no parent-child relationship, selecting the receiving terminal having the highest packet loss rate as the target terminal; and wherein if there is a parent-child relationship, selecting the receiving terminal which is the parent terminal of the group as the target terminal.

4. The bandwidth estimating method according to claim 3, wherein the respective groups classified when separating the plurality of receiving terminals into the groups are different from each other in a range of the packet loss rate at which the plurality of receiving terminals can recover a lost packet through a given error correction technique.

5. The transmitting terminal according to claim 1, wherein the transmitting terminal is further configured to transmit a packet to a specified receiving terminal, the specified receiving terminal being configured to perform Application Layer Multicasting by replicating and transmitting the packet to a plurality of other receiving terminals.

6. The bandwidth estimating method conducted by a transmitting terminal according to claim 3, wherein the transmitting terminal is configured to transmit a packet to a specified receiving terminal being configured to perform Application Layer Multicasting by replicating and transmitting the packet to a plurality of other receiving terminals.

* * * * *